United States Patent [19]
Esashi et al.

[11] 3,861,611

[45] Jan. 21, 1975

[54] ENDLESS TAPE CASSETTE

[75] Inventors: Hanjiro Esashi, Sendai; Tadamasa Takeshi, Shichigahama, both of Japan

[73] Assignee: Sony Corporation, Tokyo, Japan

[22] Filed: Sept. 14, 1972

[21] Appl. No.: 289,110

[30] Foreign Application Priority Data

Sept. 17, 1971 Japan.......................... 46-84529[U]
Sept. 21, 1971 Japan.......................... 46-85993[U]
Dec. 21, 1971 Japan........................ 46-121041[U]

[52] U.S. Cl............................. 242/55.19 A, 360/93
[51] Int. Cl............................................. B65h 17/48
[58] Field of Search...... 242/55.19 A, 55.19 R, 197, 242/198, 199, 200; 274/4 B; 179/100.2 Z

[56] References Cited

UNITED STATES PATENTS

| | | | |
|---|---|---|---|
| 1,691,414 | 11/1928 | Thornton | 242/200 |
| 2,908,769 | 10/1959 | Fonda | 242/55.19 A X |
| 2,921,787 | 1/1960 | Cousino | 242/55.19 A |
| 3,257,084 | 6/1966 | Cole, Jr. | 242/55.19 A |
| 3,637,152 | 1/1972 | Okamoto | 242/55.19 A |
| 3,712,552 | 1/1973 | Wada | 242/55.19 A |

*Primary Examiner*—Billy S. Taylor
*Attorney, Agent, or Firm*—Lewis H. Eslinger; Alvin Sinderbrand

[57] ABSTRACT

A cartridge for an endless video recording tape includes a housing and a reel, upon which the endless tape is wound, rotatably mounted in the housing. The latter includes a peripheral side wall having at least one aperture therein through which a portion of the endless tape extends during use of the cartridge in a video tape player or recorder. A cover is slidably mounted in the cartridge for movement between first and second positions in which the cover respectively covers the aperture during storage of the cartridge and exposes the aperture during use thereof. In adition, the cartridge is provided with a latching mechanism which is responsive to the position of the cover thereby to prevent rotation of the reel when the cover closes the aperture and to permit free rotation of the reel when the aperture is exposed for use in a tape player. Moreover, a takeup mechanism is provided in the housing for taking up slack in the tape after the cartridge is removed from the tape player, thereby to facilitate storage of the tape and closing of the cover.

32 Claims, 12 Drawing Figures

ENDLESS TAPE CASSETTE

The present invention relates generally to cartridges for use in magnetic recording and/or reproducing apparatus and more particularly to a tape cartridge of the endless tape type wherein a loop of magnetic tape is wound on a single reel in the cartridge.

A number of cartridge structures previously have been proposed for use with endless magnetic tape, and in particular for endless magnetic tape to be used with video tape recorders and/or players. However, one problem which exists with all such cartridges is that in use a loop of tape must be withdrawn from the cartridge in order to be wound about the rotary magnetic recording and reproducing head of the device. As a result, when the use of the cartridge is completed, and it is removed from the tape recorder, a loop of tape extends from the cartridge. This loop, being exposed, is subject to damage or tangling and, moreover, produces difficulty in storing the cartridge.

In addition, the reel in such endless tape cartridges is normally mounted for free rotation within the cartridge so that the tape can be conveniently withdrawn and rewound thereon during the operation of the tape player. However, when the cartridge is removed from the player, the free rotatable reel within the cartridge produces problems since rotation of the cartridge will cause inadvertent unwinding of the tape from the single coil of tape would thereon. The unwound tape thence can become damaged or tangled within the cartridge or even be discharged from the cartridge where it is subject to damage by tearing or the like.

One type of slack takeup mechanism is shown in Japanese Pat. No. 45-37940, issued Dec. 1, 1970 in which a dancing arm type mechanism is used to take up slack while a cartridge for endless tape is seated on a tape recorder or player. However, that device does not appear to disclose a mechanism for taking up such slack after the cartridge is removed from the recorder.

Accordingly, it is an object of the present invention to conveniently store endless magnetic tape in a cartridge on a single reel for use in video tape recorders, players and the like.

Another object of the present invention is to automatically take up slack in an endless tape mounted on a single reel in a tape cartridge so that all of the tape can be maintained within the cartridge during storage.

Yet another object of the present invention is to automatically lock the single reel in an endless tape cartridge when the cartridge is not in use.

A still further object of the present invention is to provide a tape cartridge for endless magnetic tape wound on a single reel in the cartridge, which cartridge is relatively simple to manufacture and inexpensive in construction.

In accordance with one aspect of the present invention, a cartridge for an endless magnetic tape is provided in the form of a generally square housing having a single reel rotatably mounted therein for receiving and winding an endless tape thereon. The innermost winding of the tape is used to supply the tape from the reel to a magnetic recording and/or reproducing apparatus and the tape is returned from that apparatus through an aperture in the housing to the outermost winding of the tape on the reel. A plurality of guide members are located within the cartridge housing to direct the tape from the aperture to the reel along a predetermined path of travel as the tape returns and is wound upon the reel.

A manually operable device is located within the cartridge housing for taking up slack in the endless tape when the tape cartridge is removed from the magnetic recording and/or reproducing device so that all of the tape is stored within the cartridge itself. This takeup mechanism includes a lever pivotally mounted within the housing for movement between first and second positions therein in response to a manually actuated control mechanism. The lever includes at least one tape engaging member located adjacent the path of travel of the tape when the lever is in its first or normal position. When the lever is moved from its first to its second position, the tape engaging member thereof crosses the path of travel of the tape and engages the tape to form a loop in the housing in cooperation with the guide members therein. As a result, slack in the tape, i.e. excess tape that extends outside of the housing and which had been used to provide a loop around the rotary magnetic head of the recording and reproducing device, is taken up by the lever in the loop when the cartridge is not in use.

In addition, a latching mechanism is provided in the cartridge of the present invention which includes a lever pivotally mounted in the housing and spring biased into engagement with a notched flange forming part of the tape reel. When the lever is engaged with the notched flange, the reel is held against rotation in either direction thereby.

In the preferred embodiment of the invention, the reel latching lever cooperates with a slidably mounted cover plate which is adapted to selectively cover and expose the aperture or apertures through which the tape passes during use of the cartridge. Thus, when the cartridge is in use, the cover is in its opened position and in engagement with a portion of the lever, so as to hold the lever against the bias of its associated spring, thereby maintaining the lever out of engagement with the reel so that the reel may freely rotate within the cartridge during use thereof.

The above and other objects, features and advantages of this invention, will be apparent in the following detailed description of an illustrative embodiment thereof which is to be read in connection with the accompanying drawings wherein.

Figure 1:
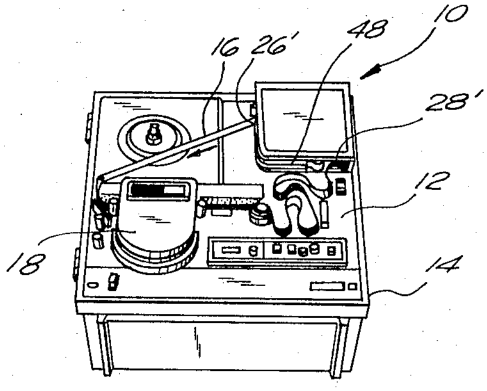
FIG. 1 is a perspective view of an endless tape cartridge constructed in accordance with the present invention and positioned in use on a magnetic tape recording and/or reproducing device.
Figure 2:
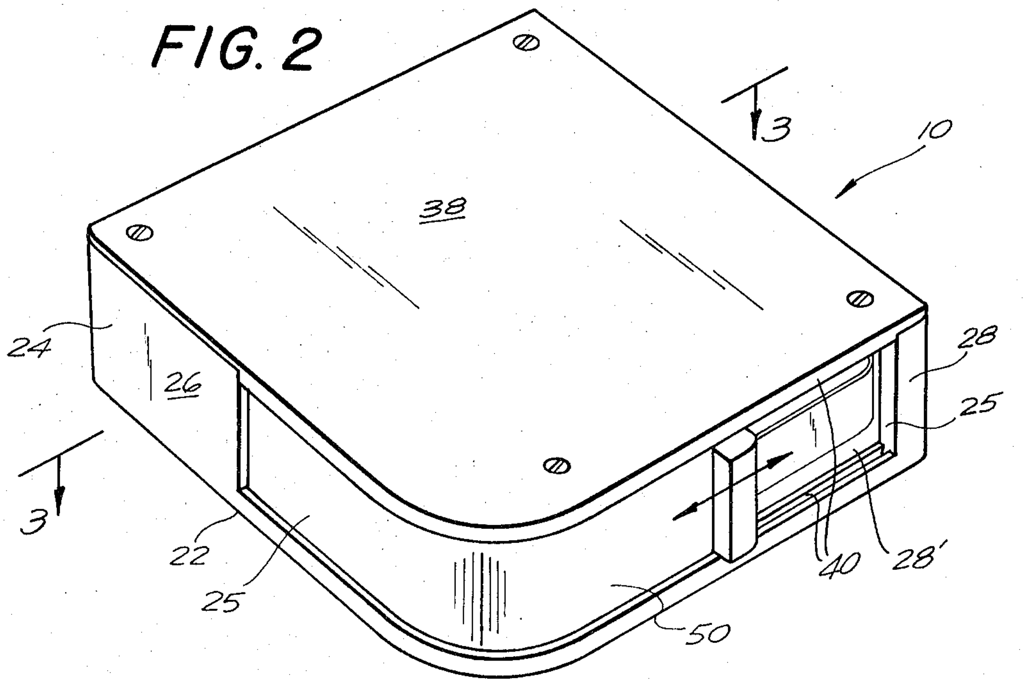
FIG. 2 is an enlarged perspective view of a tape cassette constructed in accordance with the present invention.

Referring now to the drawing in detail, and initially to FIG. 1 thereof, it will be seen that a cartridge 10 for endless magnetic recording tape or the like, is adapted to be positioned on the deck 12 of a magnetic tape recording and/or reproducing device 14. Cartridge 10 includes magnetic recording and reproducing tape 16 which extends from the cartridge in a loop, traveling in the direction indicated by the arrows in FIG. 1, about the rotary magnetic head or drum 18 of the device 14, and thence back to a position within the cartridge 10.

Preferably, cartridge 10 includes a generally square base member 22 having a peripheral side wall 24 in which an opening 25 is formed, which opening extends between two adjacent sides 26, 28 respectively. The opening 25 is partially closed by a wall 48 extending upwardly from base 22 between side walls 26, 28 thereby to form a portion of the peripheral wall of the cartridge and individual access apertures 26' and 28'.

A reel 30 is rotatably mounted on a shaft 32 formed at a central position in base 22 so that tape 16 may be wound and unwound therefrom. This shaft is normally hollow and adapted to receive or be seated on, one of the spindles of player 14. In the illustrative embodiment of the invention, tape 16 normally extends outwardly from reel 30 through the opening 26' in sidewall 26 from the innermost winding 16' of the tape on the reel, adjacent the hub 33 of the reel. From there the tape extends to the exterior of the cartridge for use in the magnetic recording and/or reproducing device 14 and thence returns through the opening 28' in the side wall 28 to the interior of the cartridge. The tape then is guided over a plurality of guide posts 34 in cartridge 10 to a position adjacent the opening 26' wherein it is wound upon the outermost tape winding 36 on reel 30. In addition, cartridge 10 includes a top or cover plate 38 which is secured to base 22 in any convenient manner, i.e., by a plurality of screws, or the like, so as to define a fully enclosed cartridge housing having the single reel 30 contained therein.

Figure 3:
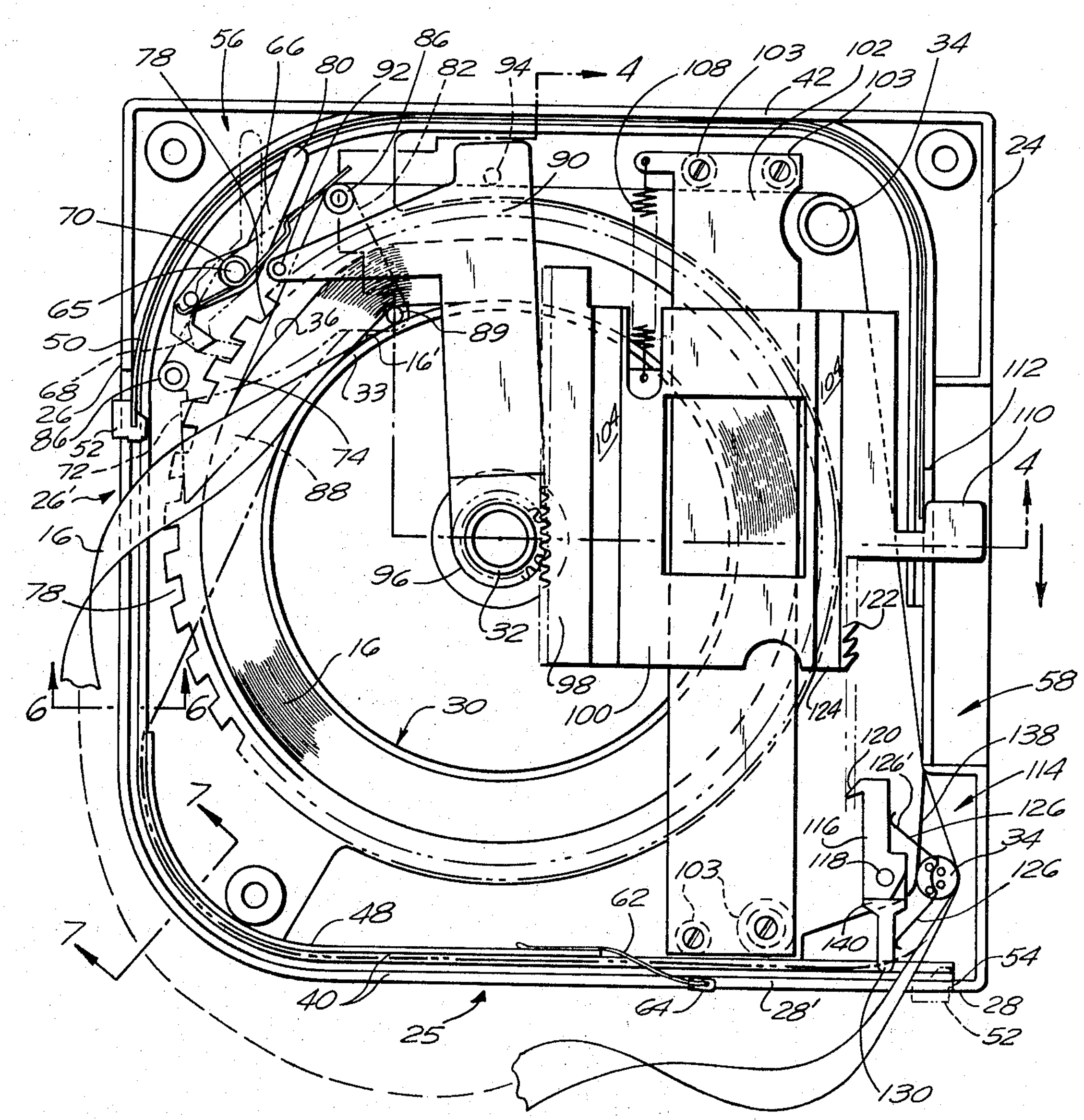
FIG. 3 is an enlarged plan view taken along line 3—3 of FIG. 2.
Figure 8:
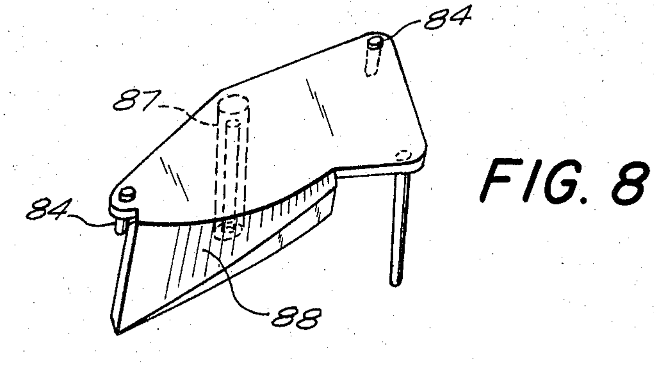
FIG. 8 is a perspective view of a tape guide member utilized in the cartridge of the present invention.
Figure 6:
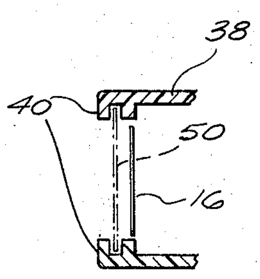
FIG. 6 is a sectional view taken along line 6—6 of FIG. 3.
Figure 7:
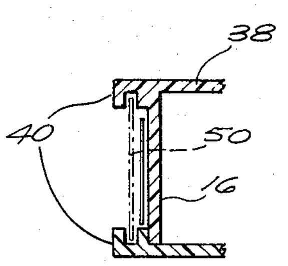
FIG. 7 is a sectional view taken along line 7—7 of FIG. 3.

In the preferred embodiment of the present invention cover 38 and base 22 each are formed with cooperating recessed tracks 40 located about the sides 26, 28 and 42 of cartridge 10. A cover plate 50, formed of a flexible plastic material or the like, is slidably mounted in tracks 40, as illustrated in FIGS. 3, 6 and 7, so that the cover plate can be slid in the cartridge from the opened solid line position thereof (illustrated in FIG. 3) to a position wherein its forward end or handle 52 is adjacent the end 54 of opening 28' (as illustrated in dotted lines in FIG. 3) wherein cover 50 closes both openings 26' and 28'. The provision of cover plate 50 is important in the present invention for several reasons. First, it fully closes the openings 26', 28' so as to prevent dust and dirt particles or the like from entering the cartridge when it is not in use. Second, cover plate 50 actuates a locking mechanism 56 which locks reel 30 in a fixed position when the cover 50 is closed, so that the reel will not rotate and dispense tape when the cartridge is not in use. And thrid, cover 50 is adapted to release a takeup mechanism 58 in cartridge 10, which takeup mechanism draws excess tape into the cartridge upon completion of use.

As mentioned, cartridge 10 is provided with tape 16 wound thereon, as illustrated in FIG. 3. As shown in phantom lines therein, tape 16 normally extends from the innermost winding 16' thereof on hub 33 through opening 26' to wall 48 and therealong to opening 28' and the first guide member 34. From there tape 16 is guided back to the outermost winding 36 on reel 30. In this position cover plate 50 can be closed, by sliding in tracks 40, so that the tape extending along wall 48 is covered by cover plate 50, and all of the tape is contained in the housing.

When cartridge 10 is to be used, cover 50 is opened by engaging the handle 52 thereof and sliding the cover to its solid line position in FIG. 3, thereby exposing tape 16 for use.

To facilitate manual engagement of tape 16, a resilient plastic strip 62, formed of polyethylene, polyester resin, or the like, is mounted on wall portion 48 and formed to bias the tape outwardly in opening 28'. The free end 64 of strip 62 is coated with a layer of polytetraflouroethylene so as to reduce sliding friction of the tape against strip 62 when the tape is being taken up on the cartridge, and also to eliminate the possible production of static electricity in the strip or cartridge because of sliding movement of the tape against the strip. In any case, strip 62 serves to bias tape 16 outwardly at opening 28' so that the tape can be manually engaged and withdrawn from the cartridge. Typically, a loop of tape having a length of 35 centimeters is withdrawn from the cartridge and used, as seen in FIG. 1, about the rotary head of the recording and reproducing apparatus.

Prior to the opening of cover 50, reel 30 is held in a fixed position by the latching mechanism 56. This latching mechanism includes a lever 66 pivotally mounted on base 22 of the cartridge and having a protrusion 68 formed at one end thereof. A spring 70, of conventional construction, operates between the cartridge housing and lever 66 to bias the lever in a generally counterclockwise direction, so as to urge protrusion 68 against the edge 72 of a peripheral flange 74 formed on the reel 30. The edge 72 of flange 74 is formed with a plurality of notches 78 therein which are adapted to cooperate with protrusion 68 on lever 66. Thus, when cover plate 50 is closed, lever 66 assumes the phantom line position thereof, shown in FIG. 3, i.e., its latching position, wherein protuberance 68 engages a notch 78 in flange 74, so as to hold reel 30 against rotation in either direction.

In the latching position of lever 66, (and when cover 50 is closed) the free end 80 thereof, opposite protuberance 68, is located between tracks 40 in base 22 and cover plate 50, i.e., in the path of travel of the cover plate. As a result of this positioning of lever 66, when cover 50 is opened, i.e., when it is moved to the position shown in solid lines in FIG. 3, the cover plate engages the free end 80 of lever 66 and pivots the lever in a generally clockwise direction about its pivot point 65. Thus, protuberance 68 is withdrawn from engagement with the notches 78 on reel flange 78 and reel 30 is free to rotate on shaft 32, during operation of the recording and reproducing device 14. Of course, when cover plate 50 is moved to its closed position, i.e., the phantom line position thereof shown in FIG. 3, lever 66 rotates in a counterclockwise direction under the influence of spring 70 so as to lock reel 30 in a fixed position and thereby prevent rotation thereof.

In order to improve the withdrawal of tape 16 from reel 30 during operation of the aparatus, cartridge 10 is provided with a guide member 82 mounted in cartridge 10 adjacent aperture 26' and above tape 16, as shown in phantom lines in FIG. 3 of the drawing. Guide member 82 includes a pair of locating pins 84 at two corners thereof which are received in posts 86 extending upwardly from base 22. In addition, member 82 includes a recessed post 87 which receives the pivot pin 65 on which lever 66 is mounted. Pins 84 and post 87 hold guide member 82 in a fixed position above the wound tape on reel 30.

Guide member 82 is formed with a curved surface 88 which extends from a position immediately adjacent hub 33 of reel 30, at the point of withdrawal of tape 16 from the innermost winding 16' of the tape on the hub. This curved surface flares outwardly from that point towards opening 26', so that tape 16 is guided from a position adjacent the hub in a gently curved path through opening 26' for use in the magnetic recording and reproducing device 14.

In addition, guide member 82 includes a depending pin 89 (see FIG. 4) positioned to be located adjacent reel hub 33. When initially winding the endless tape on the reel, the innermost winding 16' is positioned directly against hub 33 of the reel and pin 89 is inserted adjacent that winding, with the rest of the windings on the reel extending about the opposite side of the pin from the innermost winding 16'. Since the tape is endless, each portion of the tape, during use of the cartridge, will form the innermost winding 16' on the tape and will pass between pin 89 and hub 33. Pin 89 is located in a predetermined position with respect to guide surface 88 and opening 26, so that tape from the innermost winding 16' is withdrawn from hub 33 at the location of the in. Thus, pin 89 serves to space the innermost winding of the tape from the remaining windings of the tape at the point of withdrawal thereof from the hub. This is an advantageous feature of the present invention since this spacing of the withdrawn winding of the tape from the remainder of the tape eliminates frictional engagement between that winding and the windings remaining on the hub.

In previously proposed endless magnetic tape cartridges, frictional contact of the withdrawn winding with the remaining windings often causes the remaining windings to become lose or pulled, from the hub during use of the cartridge. However, by the present invention, and in particular by use of pin 89, vertical movement of the removed winding of the tape is isolated from the remaining windings of the tape so as not to disturb the compactness and position of the remaining windings stored on the reel 30.

Figure 4:
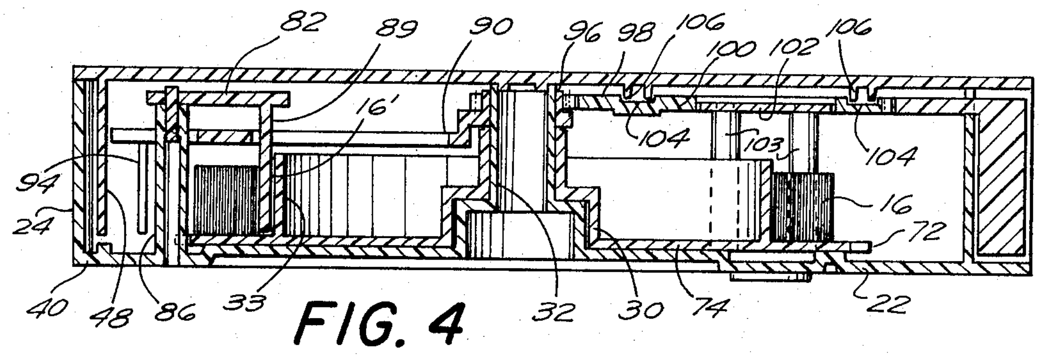
FIG. 4 is a sectional view taken along line 4—4 of FIG. 3.
Figure 5:
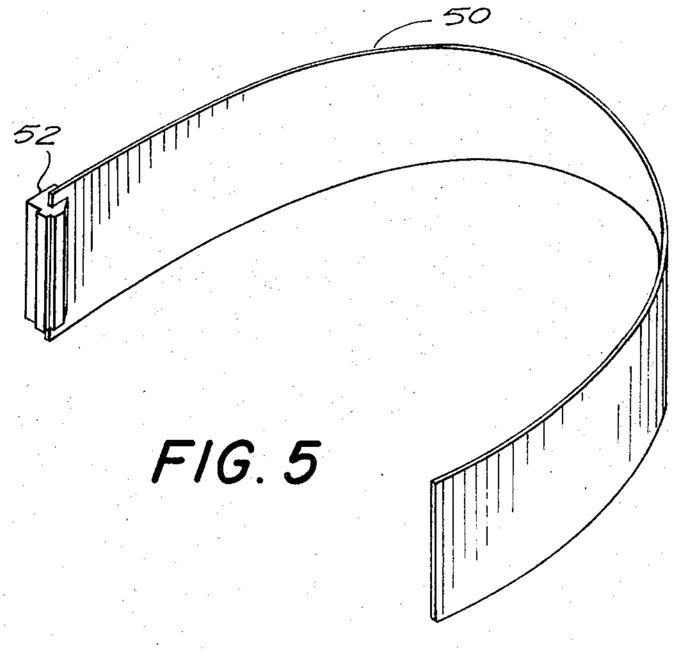
FIG. 5 is an enlarged perspective view of the cover plate utilized in the cartridge of FIG. 2.

After completing use of the cartridge 10 in the magnetic recording and reproducing device 14, it is desirable to retract the loop of tape extending from the cartridge past magnetic head 18 in order to preserve the tape and eliminate its possible damage due to dust, cuts, or the like. To accomplish this end the retracting mechanism 58 is provided within cartridge 10. This mechanism includes a lever 90 rotatably mounted on shaft 32 above reel 30, as illustrated in FIGS. 3 and 4 of the drawing. Lever 90 includes a pair of depending pins 92, 94 located on the free edge thereof. These pins are positioned adjacent the path of travel of tape 16 as it returns to the outer winding of tape on reel 30. It is noted in this regard that one of the posts 86 assists guide means 34 in defining the path of travel for tape 16 as it returns to the reel. Moreover, as seen in FIG. 3 of the drawing, pins 92, 94 are located on opposite sides of the pin 84, for reasons to be presently described, and lever 90 is positioned below guide 82 (see FIG. 4).

Figure 9:
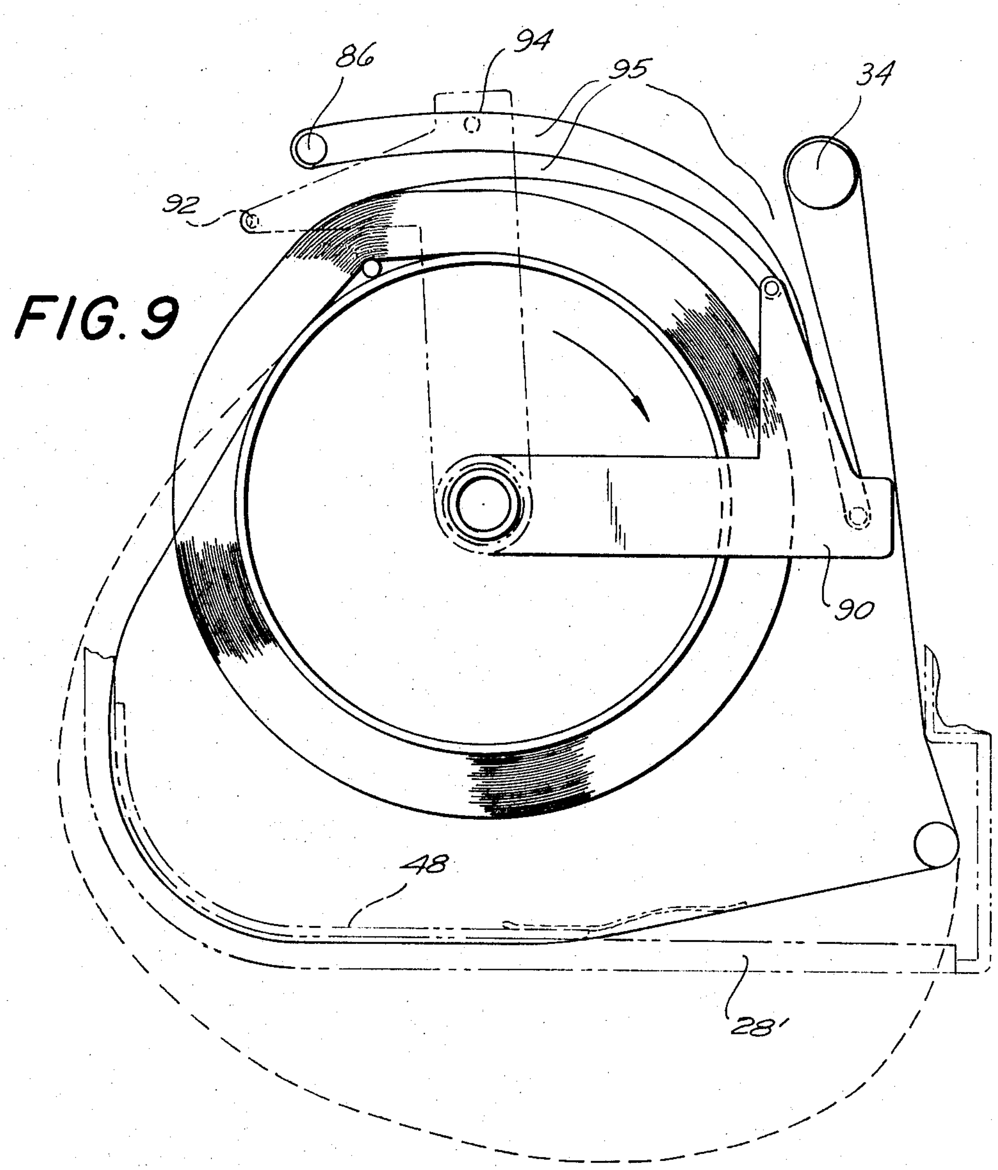
FIG. 9 is a schematic plan view of the reel and slack takeup mechanism of the cartridge shown in FIG. 2, illustrating the movement of the takeup mechanism in forming takeup loops in the cartridge.
Figure 11:
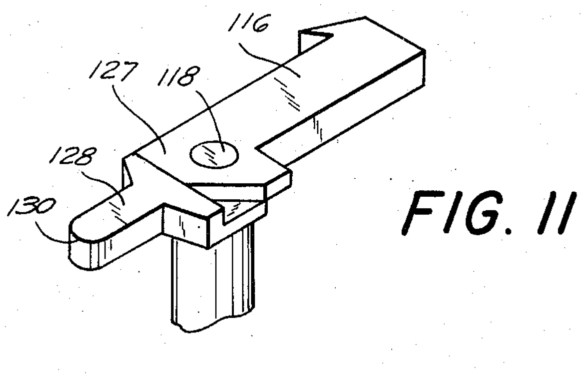
FIG. 11 is an enlarged perspective view of the latch mechanism used in the locking device shown in FIG. 10.

Lever 90 is pivotally mounted for movement between a first position illustrated in solid lines in FIG. 3 (and in phantom lines in FIG. 9) to a second position illustrated in solid lines in FIG. 9. As a result of this movement, pins 92, 94 pass through the path of travel of tape 16, egaging the tape and forming a series of loops 95 in cooperation with post 86 and one of the guide members 34. The location of guide members 34, post 86 and pins 92, 94 is selected so that the total length of the tape accommodated within loops 95 is substantially equal to the length of the loop extending from the cartridge during use thereof in the recording and reproducing device 14. Thus, upon movement of arm 90 to the solid line position thereof in FIG. 9, the entire loop of tape extending from cartridge 10 is retracted to a position within the cartridge. Thereafter, cover 50 can be conveniently closed to fully encase all of the tape stored in the cartridge thereby to prevent damage thereof and accumulation of dust on the tape.

In order to affect rotation of arm 90 from its first to its second position, as illustrated in FIG. 9, the arm or lever 90 is provided with a gear or gear segment 96 adjacent the pivotal mounting thereof on shaft 32. Gear segment 96 is adapted to cooperate with a rack 98 formed integrally with a slide plate 100. The latter is mounted for sliding movement on a support plate 102 supported in cartridge 10 above reel 30 on a plurality of posts 103. In addition, slide plate 100 is formed to include a pair of tracks 104 which cooperate with guide rails 106 secured to or formed integrally with cover 38. By this construction, slide plate 100, and thus rack 98, are adapted to slide in cartridge 10 along a path of travel defined by tracks 104, thereby to rotate arm 90 due to the meshing engagement of rack 98 and gear 96.

Slide plate 100 is biased to its uppermost position, illustrated in FIG. 3 of the drawing, by a spring 108 which is operatively connected between slide plate 100 and support plate 102. In this uppermost position, arm 90 is maintained in its first position, illustrated in solid lines in FIG. 3 and dotted lines in FIG. 9 to permit tape 16 to pass freely along its normal path of travel. In order to move plate 100 against the bias of spring 108, the plate is provided with an extension or arm 110 passing through an aperture 112 in the peripheral side wall 24 of cartridge 10. Thus, by manually engaging arm 110, and moving the same downwardly, in the direction of the arrow in FIG. 3, slide plate 100 is moved downwardly, causing rotation of lever arm 90 to the solid line position thereof shown in FIG. 9, thereby to form the storage loops 105.

Figure 10:
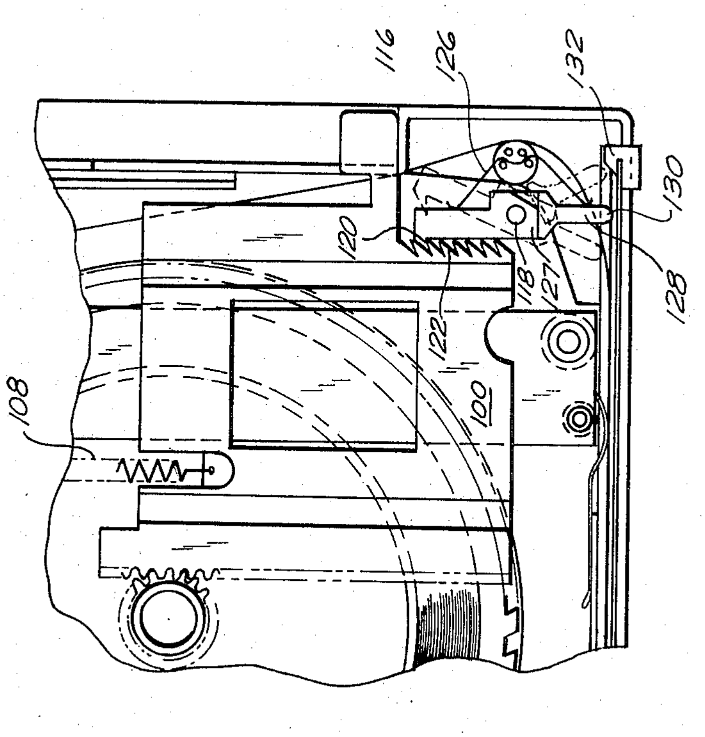
FIG. 10 is a partial plan view, similar to FIG. 3, of one embodiment of a locking mechanism used in connection with the takeup device.

In order to prevent loops 105 from becoming tangled during storate or transport of the cartridge, a latching mechanism 114 is provided which includes a lever 116 pivotally mounted on a post 118 in the base 22 of cartridge 10. Lever 116 includes a protuberance 120 which is adapted to cooperate with a plurality of stop or ratchet teeth 112 formed on the edge 124 of slide plate 100. A spring 126 normally biases lever 116 towards ratchet teeth 122 so that when the ratchet teeth are moved into a position opposite lever 116, i.e., when plate 100 is moved downwardly to cause arm 90 to form loops 105, protuberance 120 will engage teeth 122 and hold plate 100 in a fixed position against the bias of spring 108 (see FIG. 10).

In the illustrative embodiment of the invention, lever 116 includes a cam surface 127 and a cam member 128 is rotatably mounted on pin 118 for cooperation therewith. Moreover, spring 126 is a generally U-shaped member having legs 126′ which engage both lever 116 and cam 128 so that cam 128 is normally held in alignment with lever 116, in the position illustrated in FIG. 3 of the drawing. Cam 128 includes an extension portion 130 whch extends into the normal path of travel of inner extension 132 formed on the handle 52 of cover 50. By the construction of cam member 128, when cover 50 is moved to its closed position, shown in dotted lines in FIG. 3, the extension 132 of the cover engages the end 130 of cam 128 to rotate the cam in a generally counterclockwise direction, about pivot 116 against spring 126. However, because of the inclined surface 138 of cam 127 on lever 116, movement of the cam does not effect movement of the lever, so that plate 100 is held in its fixed position. On the other hand, when it is desired to open cover 50, movement of the cover past lever 128 causes extension 132 of handle 52 to pivot lever 128 in a clockwise direction, whereby its edge 140 abuts cam surface 127, causing lever 116 also to pivot in a clockwise direction, thereby releasing engagement of protuberance 120 and ratchet teeth 122. Accordingly, slide plate 100 is immediately withdrawn to its first position, illustrated in FIG. 3, as is lever arm 90, so that the tape forming loops 105 is available to be withdrawn from the cartridge to form the single loop required for use of the cartridge on the tape recording and reproducing device 14.

It is noted that even though spring 126 returns lever 116 to its normal posiiton after protuberance 132 passes the end 130 of the cam 128, slide 100 still reaches its first position because the action of spring 108 is instantaneous and the time take for the movement of lever 116 is sufficient to permit slide 100 to return to its initial position under the influence of spring 108.

Figure 12:
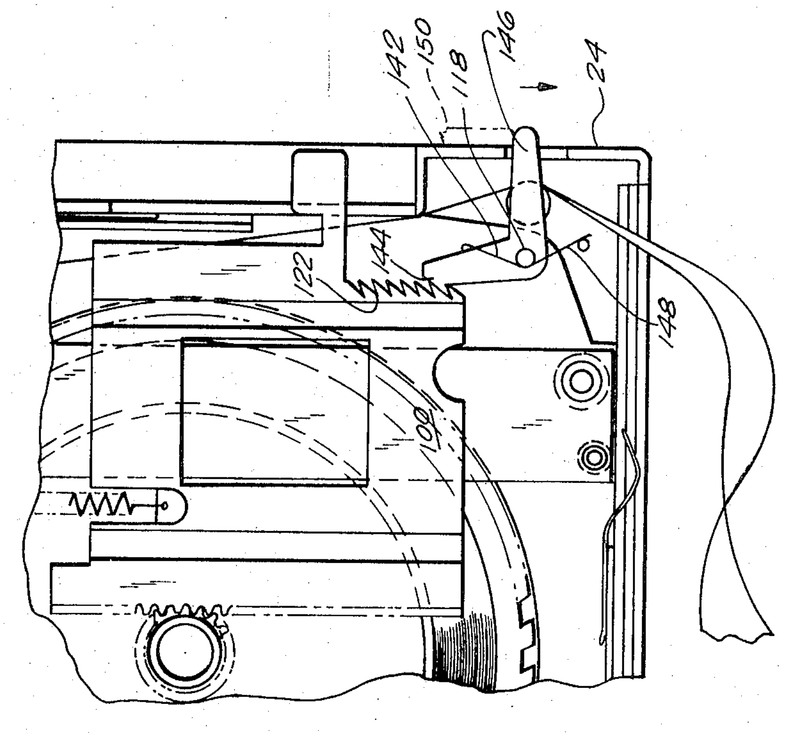
FIG. 12 is a plan view, similar to FIG. 10, of another embodiment of a locking mechanism adapted to be used in connection with the cartridge of the present invention.

Referring now to FIG. 12 of the drawing, another embodiment of the latching mechanism 114 is shown. In this embodiment, slide 100 and ratchet 122 are constructed in the same manner as in the embodiment illustrated in FIG. 3, and all of the remaining elements of the cartridge are the same. However, in this embodiment, in lieu of the lever 116, a generally L-shaped lever 142 is provided which is pivotally mounted on the pin 118. Lever 142 includes a protuberance 144 and a leg 146 which extends through the peripheral side 24 of of cartridge 10 so as to interfere with the path of travel of cover 50. A spring 148 of conventional construction is provided for normally biasing lever 142 in a counterclockwise direction so that protuberance 144 is normally biased towards ratchet 122 to hold slide plate 100, and thus lever arm 90, in a fixed position in which loops 105 are formed. When it is desired to return lever 90 to its first position, wherein the tape may be withdrawn from the cartridge, leg 146 of lever 142 is merely manually depressed, in the direction of the arrow shown in FIG. 12, so as to rotate the lever in a clockwise direction, freeing engagement of protuberance 144 and ratchet 122 so that slide 100 will return to its uppermost position (FIG. 3) under the influence of spring 108. It is also contemplated that by this construction of the invention a cooperating abutment 150, illustrated in phantom in FIG. 12, can be provided on the deck 12 of device 14 so that when the cartridge is placed on the device, and positioned for operation, abutment 150 will urge lever 142 in a clockwise direction and hold the lever in a fixed position away from ratchet 122 until such time as the cartridge is removed from the device.

It is noted that by the cooperating slanted configuration of the teeth 122 and protuberances 124, 144 of levers 116 and 142, these levers do not interfere with the sliding movement of plate 100 in its downward direction, i.e., towards the second position of the plate and the lever. The teeth on the ratchet merely cam levers 116, 142 away from the ratchet as it is moved downwardly. When movement is stopped, levers 116 and 142 are immediately urged back into engagement with the flat surfaces of the ratchet teeth in a conventional manner, under the influence of their associated spring so as to hold the slide plate in a fixed position.

Accordingly, it is seen that a relatively simple and inexpensive cartridge is provided in which a slidably mounted cover plate 50 covers the apertures through which the tape and the cartridge extend during use of the device, thereby to fully enclose the tape within the cartridge for storage. When the cartridge is to be utilized in a magnetic tape recording and reproducing device 14, the cover 50 is opened, i.e., moved to its solid line posiition shown in FIG. 3, thereby pivoting lever 66 in a clockwise direction freeing engagement of its protuberance 68 from the notches 78 in the flange 74 of reel 30. As a result, reel 30 is free to dispense and rewind tape thereon. Upon movement of cover 50 to its storage position, the protuberance 132 on handle 52 engages the free end 130 of cam member 128 so as to release latching mechanism 114 and permit slide plate 100 to return to its position illustrated in FIG. 3 of the drawing, under the influence of spring 108. As a result, lever arm 90 is rotated to the solid line position thereof shown in FIG. 3 so as to free tape 16 in the loop 105 (which the arm 90 had previously formed) for withdrawal from the cartridge. To facilitate this withdrawal, polyethylene strip 62, mounted on wall 48, urges the tape outwardly to present it adjacent the exterior of the cartridge for manual engagement. Accordingly, the tape from loops 105 in the cartridge can be withdrawn and guided into position about the recording and reproducing head of the device 14.

Upon completion of use of the cartridge 10, the cartridge is removed from the recording and reproducing device 14 and actuator arm 110 is moved downwardly to move slide plate 100 towards opening 28′. As a result of this movement, rack 98 causes gear segment 96, and thus arm 90, to rotate, until arm 90 reaches its second position illustrated in solid lines in FIG. 9. In that position, because of the action of pins 92, 94, tape 16 is drawn into a plurality of loops 105. As a result of the formation of these loops, all of the tape in the loop outside of the cartridge, i.e., the tape which previously extend about the magnetic recording and reproducing head 18, is drawn into the cartridge. Of course, plate 100 and thus lever arm 90, are held in this position by latch mechanism 114 so as to hold the loops under a slight tension and prevent their becoming tangled in the cartridge during transportation or storage.

After loops 105 are formed, cover 50 may be closed to fully encase the tape. When cover 50 is moved to its closed position, lever 66 is free to rotate in a counterclockwise direction, under the influence of its cooperating spring 70, so that the protuberance 68 of the lever will be engaged in a notch 78 of reel 30, thereby to hold the reel against rotation during transportation and storage of the cartridge. Subsequently, when the cartridge is to be used, again, opening of cover 50 causes extension 132 thereon to pivot cam member 128 in a clockwise direction, thereby pivoting lever 116 in a clockwise direction to release slide plate 100, whereby the latter moves to its original position, illustrated in FIG. 3, under the influence of spring 108. Thus, arm 90 is returned to its original position, illustrated in solid lines in FIG. 3, so that the loops of tape which had previously been formed are free to be withdrawn from the tape. Simultaneously, closing of cover 50 releases the engagement of lever 66 with reel 30 to permit the reel to be rotated.

Accordingly, it is seen that a relatively simple and inexpensive cartridge for endless tape is provided which has many desirable features including the automatic locking of the single reel of the cassette during transportation and storage and the convenient formation of a plurality of loops within the cartridge for storing the excess tape which normally extends from the cartridge during use thereof. Moreover, a convenient guide mechanism is provided which assures smooth, gentle movement of the tape from the reel, and which eliminates pulling or prevents the inadvertent withdrawal of tape windings from the cartridge. Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A cartridge for an endless tape comprising a housing and a reel for said endless tape rotatably mounted therein, said housing including a peripheral side wall having at least one aperture therein through which a portion of said endless tape extends during use of the cartridge, means for selectively opening and closing said aperture, and a flexible strip of plastic material mounted at one end on said side wall adjacent said aperture for biasing said tape outwardly when said aperture is opened.

2. The cartridge as defined in claim 1 including a layer of polytetrafluoroethylene secured to the free end of said strip, opposite said one end thereof, for engaging said tape and providing a sliding surface therefore.

3. A cartridge for an endless tape comprising a housing and a reel for said endless tape rotatably mounted therein, said housing including a peripheral side wall having at least one aperture therein through which a portion of said endless tape extends during use of the cartridge, means for selectively opening and closing said aperture, and means in said housing for taking up slack in said endless tape when said cartridge is not in use.

4. A cartridge as defined in claim 3 including guide means for directing said tape from said aperture to said reel along a predetermined path of travel, and wherein said means for taking up slack comprises a lever pivotally mounted in said housing for movement between first position and second positions therein, and means for pivoting said lever; said lever including at least one tape engaging member located adjacent said predetermined path of travel when said lever is in its first position and passing through said path of travel as said lever is pivoted from said first to said second position to engage said tape and form a loop in said housing, whereby slack in said tape is taken up by said lever and used to form said loop.

5. The cartridge as defined in claim 4 including means for releasably locking said lever in said second position.

6. The cartridge as defined in claim 4 including means for normally biasing said lever into its first position.

7. The cartridge as defined in claim 6 wherein said lever is mounted for rotation on the same axis as said reel and includes a gear segment adjacent said axis of rotation, said means for pivoting said lever including a toothed rack member slidably mounted in said housing in meshing engagement with said gear segment.

8. The cartridge as defined in claim 7 including manually engageable means extending through said housing for selectively sliding said rack therein to pivot said lever.

9. The cartridge as defined in claim 7 including a spring operatively connected between said rack and said housing to bias said rack to a first position corresponding to the first position of said lever.

10. The cartridge as defined in claim 9 including means for releasably locking said rack in a second position corresponding to the second position of said lever.

11. The cartridge as defined in claim 10 wherein said rack includes a plurality of ratchet teeth formed thereon and said means for releasably locking said rack comprises a second lever pivotally mounted in said housing and having a protrusion for engaging said ratchet teeth when said rack is in its second position, and spring means for normally biasing said second lever into engagement with said rack.

12. The cartridge as defined in claim 11 wherein said second lever is located adjacent said aperture for cooperation with said means for selectively opening and closing said aperture whereby said last mentioned means pivots said second lever against the bias of spring means when said aperture is opened, thereby permitting said rack and said first mentioned lever to return to their first position under the influence of said spring.

13. The cartridge as defined in claim 12 wherein said means for selectively opening and closing said aperture comprises a plate slidably mounted in said housing for movement between first and second positions in which said aperture is respectively opened and closed and having an inwardly projecting protrusion formed therein; said second lever including an end portion, opposite its protrusion, extending into the path of travel of said plate for engagement with the inwardly projecting protrusion on said plate as the plate is moved to its first position, thereby to pivot said second lever away from said rack as said cover plate is moved away from said aperture to open the latter.

14. A cartridge for an endless tape comprising, a housing and a reel for said endless tape rotatably mounted therein, said housing including a peripheral side wall having at least one aperture therein through which a portion of said endless tape extends during use of the cartridge, guide means in said housing for directing said tape from said aperture to said reel along a predetermined path of travel, and means in said housing for taking up slack in said endless tape when said cartridge is not in use, including, a first lever pivotally mounted in said housing for movement between first and second positions therein and means for pivoting said lever between said positions including means normally biasing said lever to said first position thereof, said lever including at least one tape engaging member located adjacent said predetermined path of travel when said lever is in its first position and passing through said path of travel as said lever is pivoted from said first to said second positions to engage said tape and form a loop of tape in said housing in cooperation with said guide means, whereby slack in said tape is taken up by said lever in said loop when said cartridge is not in use.

15. The cartridge as defined in claim 14 including means for releasably locking said lever in said second position.

16. The cartridge as defined in claim 15 wherein said lever is mounted for rotation on the same axis as said reel and includes a gear segment adjacent said axis of rotation, and means for pivoting said lever including a toothed rack member slidably mounted in said housing in meshing engagement with said gear segment.

17. The cartridge as defined in claim 16 including manually engageable means extending through said housing for selectively sliding said rack therein to pivot said lever.

18. The cartridge as defined in claim 17 wherein said means biasing said first lever to its first position comprises a sppring operatively connected between said rack and said housing to bias said rack to a first position corresponding to the first position of said lever.

19. The cartridge as defined in claim 18 wherein said means for releasably locking said first lever in said second position comprises means for locking said rack in a second position corresponding to the second position of the lever wherein the cooperating teeth on said rack and gear segment hold said first lever in its second position.

20. The cartridge as defined in claim 17 wherein said rack includes a plurality of ratchet teeth formed thereon and said means for releasably locking said rack comprises a second lever pivotally mounted in said housing and having a protrusion for engaging said ratchet teeth when said rack is in its second position, and spring means for normally biasing said second lever into engagement with said rack.

21. The cartridge as defined in claim 20 wherein said peripheral side wall of the housing includes first and second apertures therein, said tape extending from said reel through said first aperture to the exterior of said cartridge and thence into the other of said apertures to said guide means and reel, said peripheral wall including a wall portion between said apertures against which said tape is drawn when said first lever is in its second position.

22. The cartridge as defined in claim 21 including a flexible cover plate slidably mounted therein adjacent said first and second apertures and movable between a first position wherein it covers said apertures and a second position wherein said apertures are exposed.

23. The cartridge as defined in claim 22 wherein said second lever is located adjacent said second aperture and includes an end portion, opposite its protrusion, extending into the path of travel of said cover plate; said end portion of said second lever thereby being engaged with said cover plate as the latter is moved from its first to its second position to pivot said second lever against the bias of said spring means and permitting said rack and said first lever to return to their first positions under the influence of said spring.

24. The cartridge as defined in claim 21 wherein said second lever includes an operating arm extending through said housing to permit manual pivoting of said second lever against the bias of said sring means, thereby to permit said rack and said first lever to return to their first position under the influence of said spring.

25. The cartridge as defined in claim 22 including means responsive to the position of said cover plate for preventing rotation of said reel when said cover plate is in its first position and for permitting free rotation of said reel when said cover plate is in its second position.

26. The cartridge as defined in claim 25 wherein said reel includes a flange having a plurality of notches formed on the periphery thereof and said means for preventing rotation of said reel includes a third lever pivotally mounted in said housing adjacent said aperture, said third lever having a first end portion extending into the path of travel of said cover plate and a second, opposite end portion having a protrusion adapted to be received in said notch, and second spring means normally biasing said third lever in a first direction to engage said protuberance in an adjacent notch in said reel flange thereby to prevent rotation of said reel, said first end portion of said third lever being located in a predetermined position with respect to said cover plate, whereby when said cover plate is in its first position, it engages said first end portion of the third lever to hold said third lever against the bias of its associated spring means with said protuberance out of engagement with said reel thereby to free said reel for rotation.

27. The cartridge as defined in claim 25 including a flexible strip of plastic material mounted in said cartridge adjacent said second aperture for biasing said tape outwardly when said second aperture is exposed by said cover plate.

28. The cartridge as defined in claim 25 including means mounted in said housing adjacent said reel and said first aperture for defining a guide surface for tape on said reel as it is removed therefrom during use of said cartridge.

29. The cartridge as defined in claim 25 including a pin mounted in said housing adjacent said reel at the point of discharge of tape from the innermost winding thereof on the reel, said pin being positioned between the innermost winding of the tape on the reel and the remainder of the tape thereon, whereby said innermost winding is withdrawn from said reel without engaging and pulling the remaining tape windings from said reel.

30. A cartridge for an endless tape, comprising, a housing and a reel for said endless tape rotatably mounted therein, said housing including a peripheral side wall having at least one aperture therein through which a portion of said endless tape extends during use of the cartridge, cover means mounted in said cartridge for movement between first and second positions in which said cover respectively covers and exposes said aperture, means responsive to the position of said cover means for preventing rotation of said reel when said cover means is in its first position and for permitting rotation of said reel when said cover means is in its second position, and means in said housing for taking up slack in said endless tape when said cartridge is not in use.

31. A cartridge as defined as defined in claim 30 including means mounted in said housing adjacent said reel and said aperture, defining a guide surface superimposed over a portion of the tape on said reel for guiding the tape from the innermost winding of the reel through said aperture along a gently curved path of travel.

32. A cartridge as defined in claim 31 wherein said last mentioned means includes a pin located adjacent said reel at the point of discharge of tape from the innermost winding on the reel, said pin being positioned between the innermost winding of tape on the reel and the remainder of the tape thereon, whereby said innermost winding is withdrawn from said reel without engaging and pulling the remaining tape windings and is directed to said guide surface for discharge from said cartridge.

* * * * *